April 29, 1941.   W. F. MAYER   2,239,727
PUMPING APPARATUS
Filed March 21, 1938   9 Sheets-Sheet 1
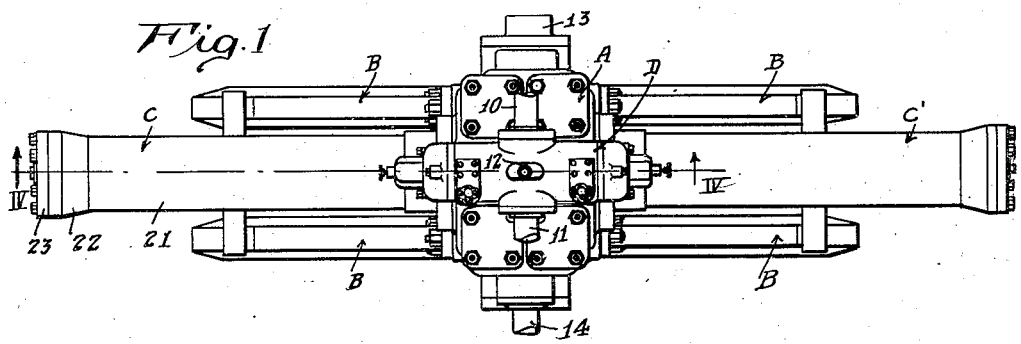
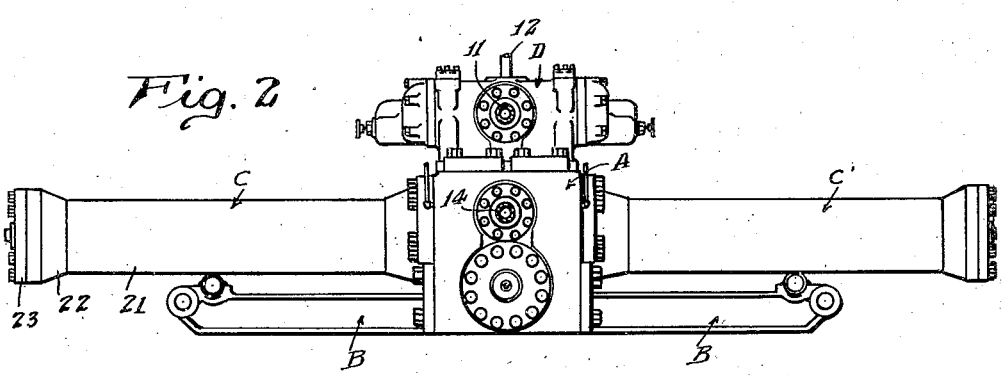
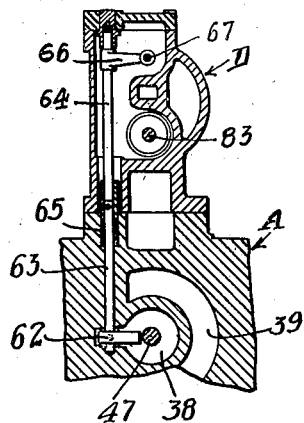
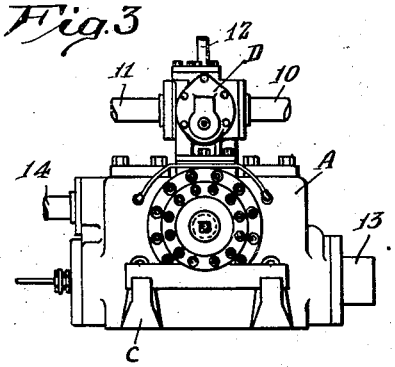
Inventor
Waldemar F. Mayer
By Lyon & Lyon
Attorneys

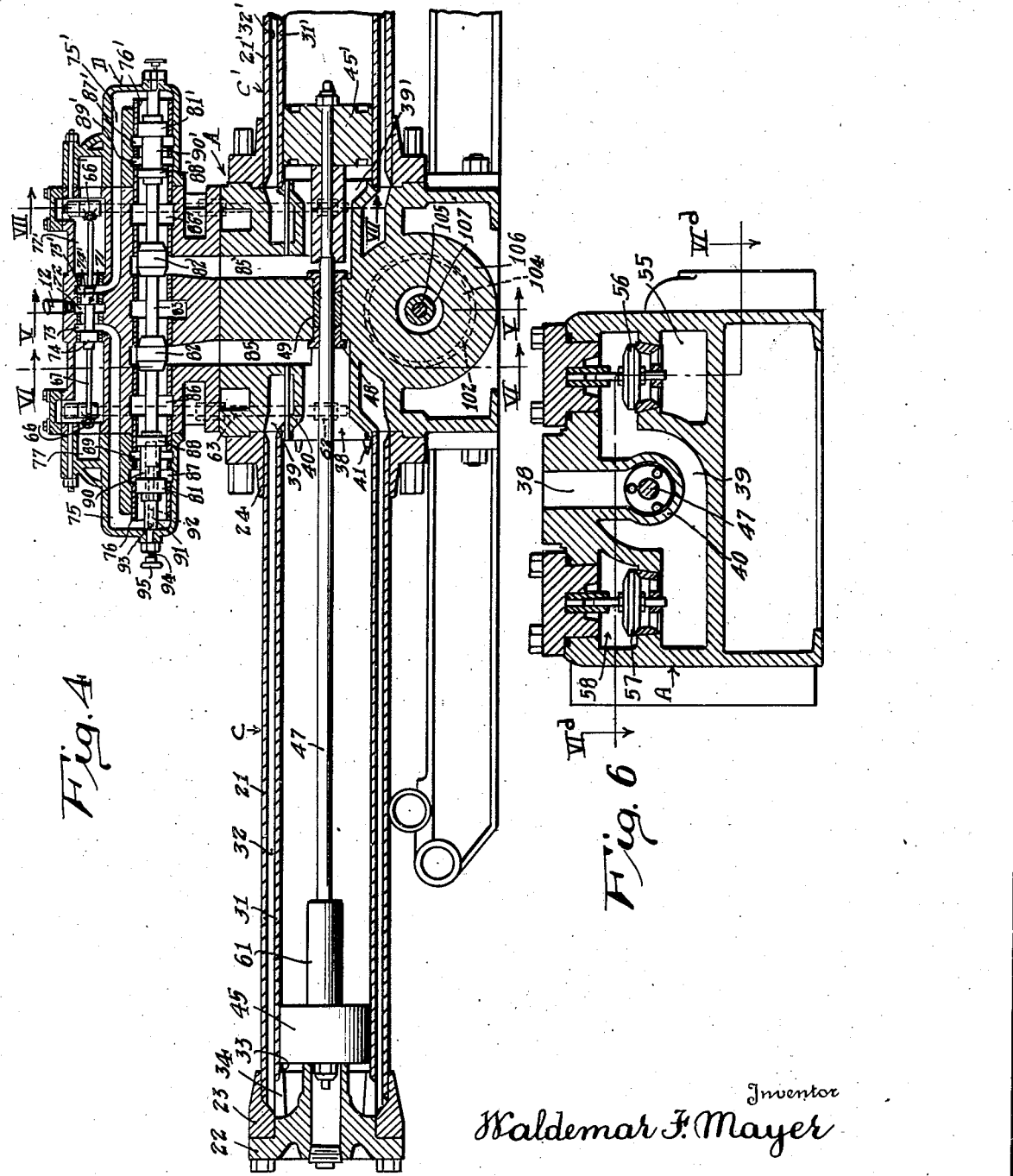

April 29, 1941.   W. F. MAYER   2,239,727
PUMPING APPARATUS
Filed March 21, 1938   9 Sheets-Sheet 3

Fig. 5

Fig. 6<sup>d</sup>

Inventor
Waldemar F. Mayer
By Lyon & Lyon
Attorneys

Inventor
Waldemar F. Mayer
By Lyon & Lyon
Attorneys

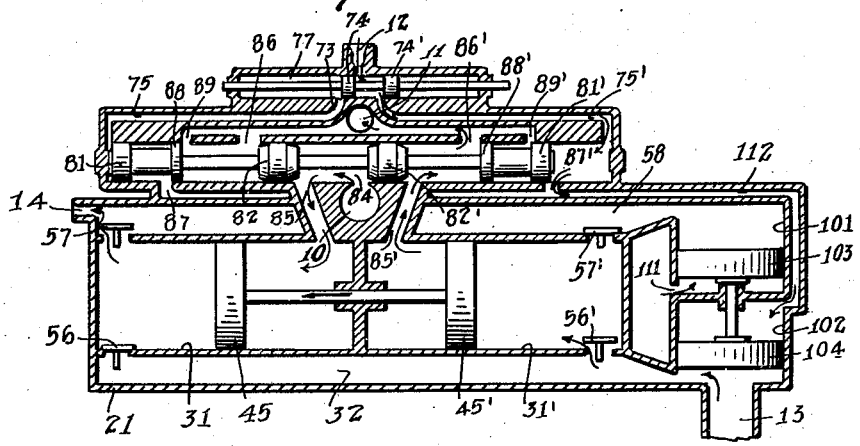
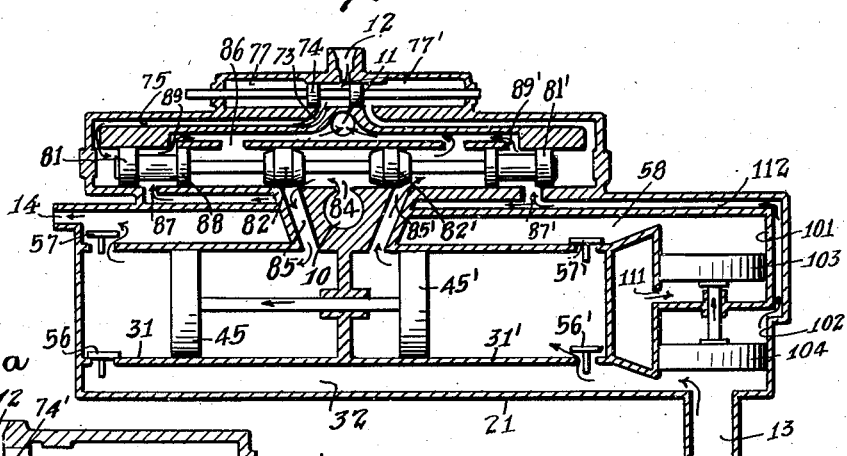
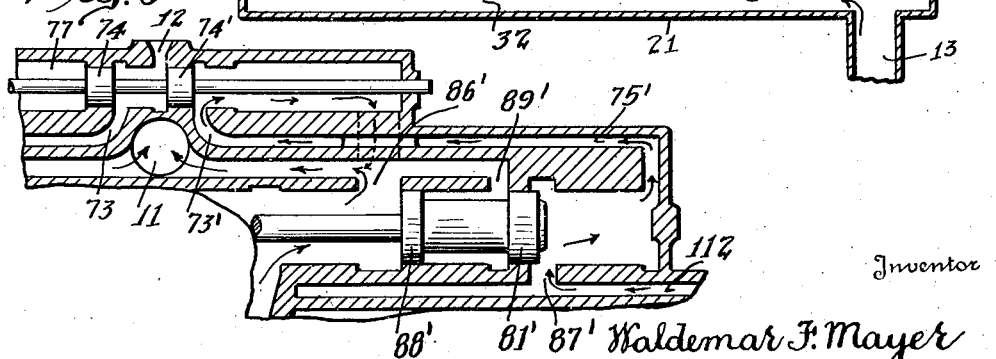

April 29, 1941.  W. F. MAYER  2,239,727
PUMPING APPARATUS
Filed March 21, 1938  9 Sheets-Sheet 6

Inventor
Waldemar F. Mayer.

By Lyon & Lyon
Attorneys

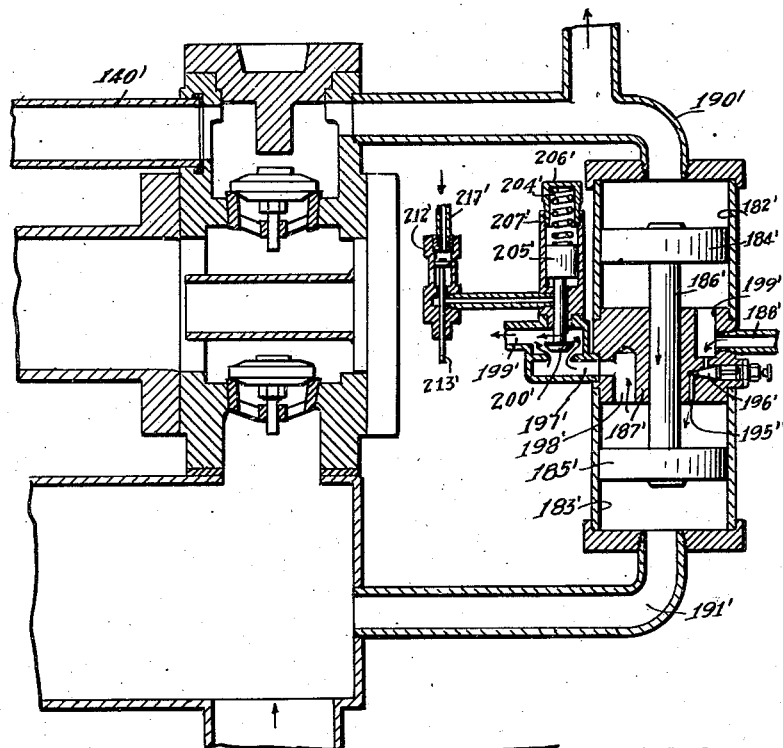
Fig.14
Fig.12a
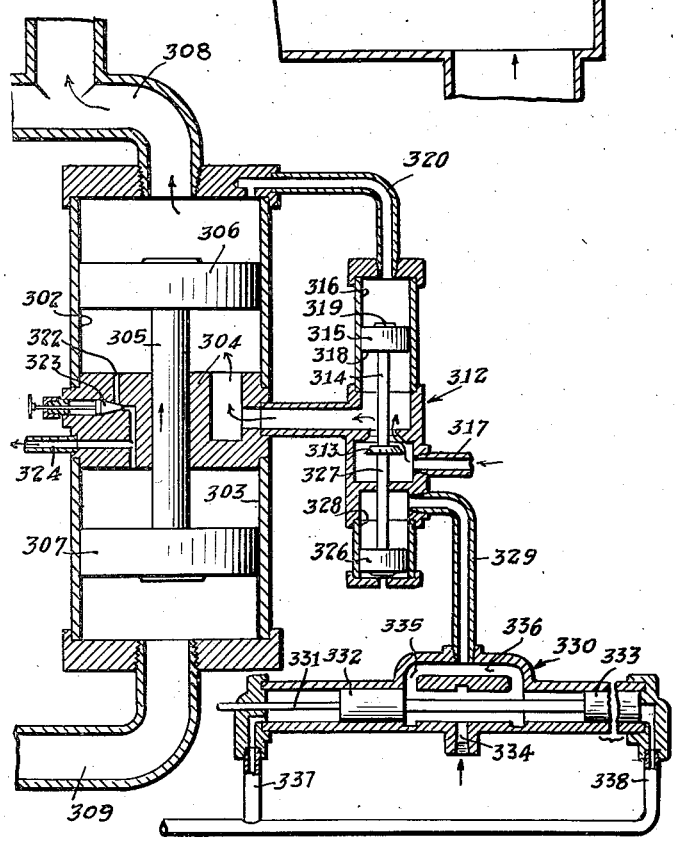
Inventor
Waldemar F. Mayer
Lyon & Lyon
By        Attorneys Patented Apr. 29, 1941

2,239,727

UNITED STATES PATENT OFFICE 2,239,727

PUMPING APPARATUS

Waldemar F. Mayer, Los Angeles, Calif., assignor to Byron Jackson Co., Huntington Park, Calif., a corporation of Delaware Application March 21, 1938, Serial No. 197,142

34 Claims. (Cl. 103—52)

This invention relates generally to hydraulically actuated pumps, and is directed particularly to improvements in simplex, double-acting hydraulic pumps.

Hydraulic pumps of the type referred to herein comprise generally a pair of cylinders in each of which a piston is reciprocated, the pistons being interconnected for reciprocation in unison. In one form, one cylinder constitutes a single-cylinder, double-acting hydraulic motor in which a motive liquid is admitted alternately to opposite ends to produce a power stroke of the piston in each direction. The other cylinder constitutes a single-cylinder, double-acting pump in which the piston is direct-connected to the piston of the hydraulic motor to be reciprocated thereby and to pump liquid on each stroke.

In another form of this type of pump and the form illustrated herein, the hydraulic motor is interposed between the two halves of the pump, the inner side of each piston being subjected to motive liquid and the outerside of each piston being in contact with liquid to be pumped. For reasons set forth in detail in the copending application of Aladar Hollander, Serial No. 197,139, filed concurrently herewith, patented January 23, 1940, No. 2,187,972, the latter form of pump has many advantages over the first-mentioned form, particularly for handling liquids at high pressure. However, the improvements constituting the present invention are intended to cure certain defects which are characteristic of both forms, and, while the improvements are illustrated and described as embodied in a pump of the second-mentioned form, it will be apparent that they are equally applicable to the first-mentioned form or to any other form having similar operating characteristics.

In this type of pump, liquid is pumped only from a single cylinder at a time, and, in the absence of any flow equalizing or compensating means, the discharge will be temporarily interrupted during reversal of the piston at the end of each stroke. While this may not be a serious objection under certain conditions, such as low pressure and rapid reversal, it constitutes a serious defect when attempting to pump at high pressure. More serious still is the temporary interruption of flow of motive liquid as the reversing valve passes through dead center. When operating at high pressure, this sudden interruption of flow and consequent sudden rise in pressure causes hammering which would destroy the pump in a short time. It is therefore imperative that the flow of motive liquid be continuous and that pressure variations therein be reduced to a minimum. This is necessary for smooth performance of the pump, and is also highly desirable if the hydraulic pump is a part of a hydraulic system including other devices operated by motive liquid from a common source. Pressure fluctuations in the motive liquid resulting from irregular flow to the pump would naturally have a detrimental effect on the operation of other hydraulically operated devices of the system.

In adapting a hydraulic pump of the aforementioned type to handling liquids at high pressure, it has not only been discovered that it is essential to provide steady flow of the motive liquid and of the pump discharge, but also that uneven flow of suction liquid to the pump and of spent motive liquid from the pump is highly objectionable. When operating at low pressure and relative high velocity, the momentum of the pumped liquid will continue the flow directly from the suction inlet to the discharge outlet during stroke reversals; however, when operating at high pressure this is not the case, and the suction and discharge are interrupted completely at each reversal unless provision is made to continue the flow. It is essential to smooth performance of the pump at high pressure that the flow of all four liquids be steady.

In the copending application of Aladar Hollander and Waldemar F. Mayer, Serial No. 197,140 filed concurrently herewith, there is disclosed a surge device operated by the motive liquid for providing continuous flow of motive liquid to the pump, of spent motive liquid from the pump, of suction liquid to the pump, and of discharge liquid from the pump, the operation of the surge device being dependent on a slight pressure drop in the pump discharge.

A broad object of the present invention is to reduce to the greatest extent possible, liquid pressure and flow irregularities in a piston type pump.

A more specific object is to provide a surge device for use with a hydraulically actuated piston pump, which device does not depend upon an initial pressure drop to cause it to function, thereby making it possible to completely compensate for the pressure and flow irregularities normally resulting from piston reversal.

The foregoing objects are achieved in accordance with the present invention by employing a surge device operated in synchronism with the reversing valve of the pumps, by the motive liquid, but under the control of an independent pressure fluid.

A feature of the invention is a hydraulic pump having a reversing valve actuated by a control pressure fluid independent of the motive liquid, and a surge device operated by the motive liquid but controlled by the control fluid in synchronism with the actuation of the reversing valve.

Other objects, features and advantages of this invention will be apparent from the following description of certain preferred embodiments of the invention, taken in conjunction with the accompanying drawings, wherein:

Fig. 1 is a plan view of one form of pump constructed in accordance with the invention;

Fig. 2 is a side elevation of the same pump;

Fig. 3 is an end elevation of the same pump;

Fig. 4 is a vertical longitudinal section through a portion of the pump, taken substantially in the line IV—IV of Fig. 1;

Fig. 5 is a transverse vertical section taken approximately in the plane V—V of Fig. 4;

Fig. 6 is a transverse vertical section taken approximately in the plane VI—VI of Fig. 4;

Fig. 6d is a horizontal section taken approximately in the plane VI$^d$—VI$^d$ of Fig. 6;

Fig. 7 is a fragmentary transverse vertical section taken approximately in the plane VII—VII of Fig. 4;

Figure 10:
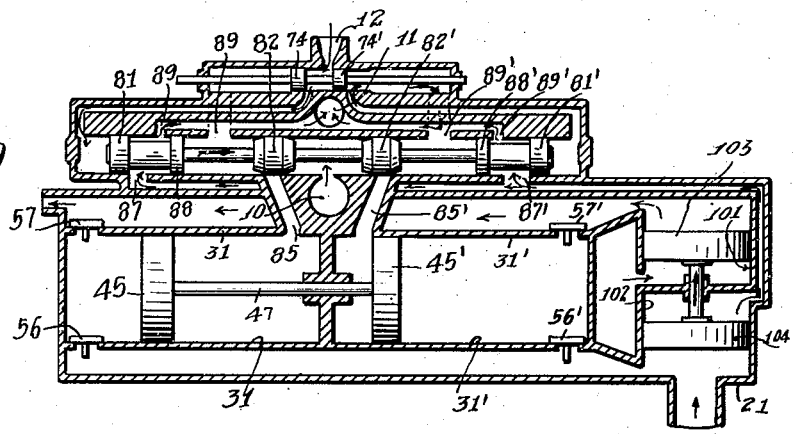
Figure 11:
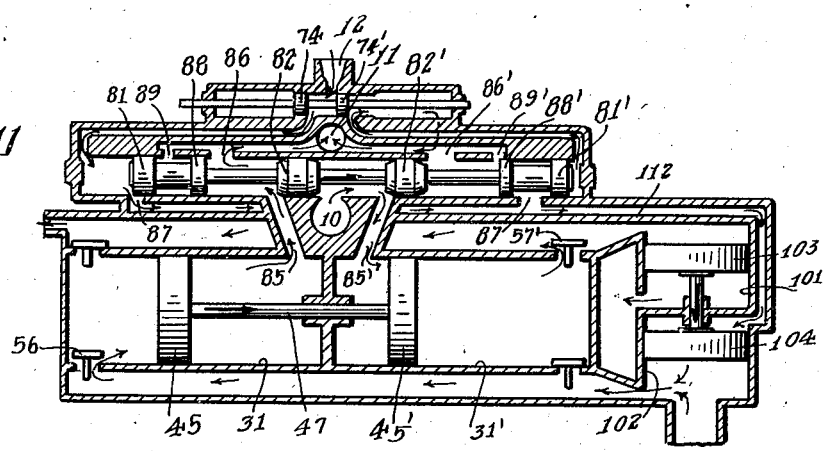
Figure 12:
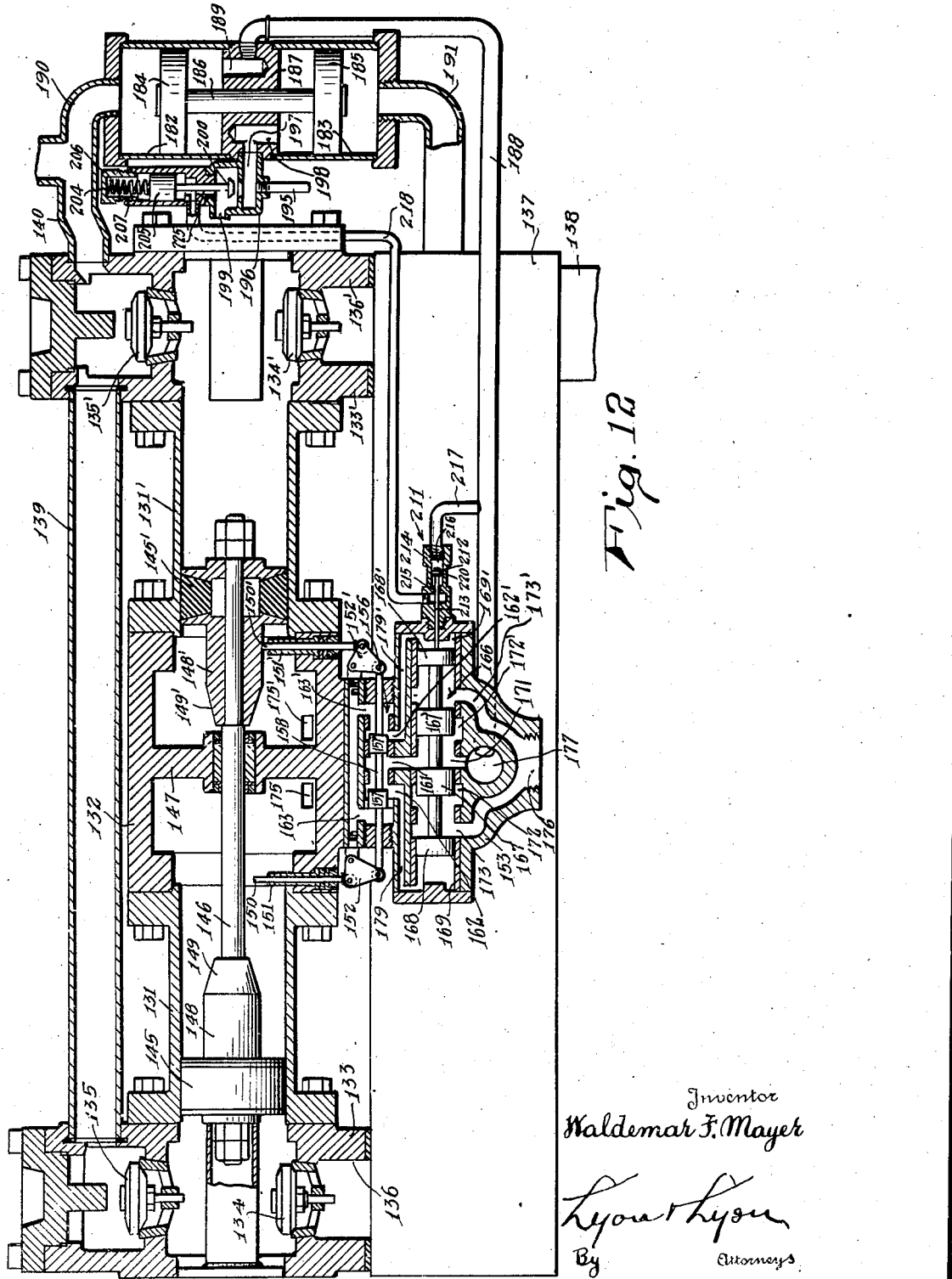
Figure 13:
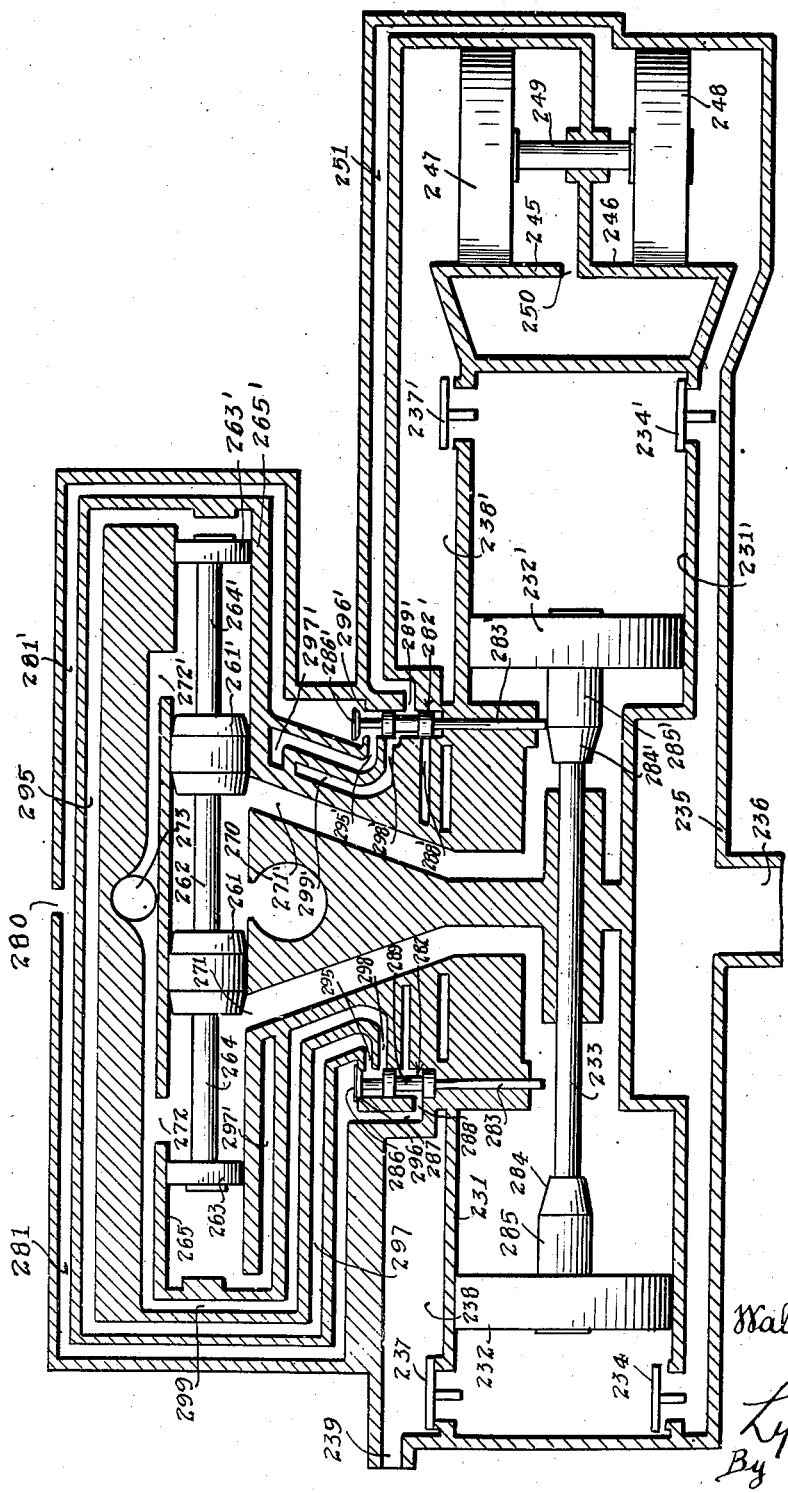

Figs. 8 to 11, inclusive, are schematic diagrams illustrating the operation of the pump;

Fig. 12 is a schematic diagram showing a modification of the structure illustrated in Figs. 1 to 11;

Fig. 12a is a schematic diagram similar to Fig. 12 but showing another modification;

Fig. 13 is a schematic diagram illustrating still another modification and the invention; and Fig. 14 is a schematic diagram illustrating a modification of the system shown in Figs. 12 and 12a.

Referring to the form of the invention shown in Figs. 1 to 11, the pump comprises generally a central body A mounted on skids B and having secured thereto a pair of cylinders C, C' in axial alinement on opposite sides of the central body. A valve housing D is secured to the upper surface of the central body. An inlet pipe 10 for motive liquid under pressure is connected to one side of the valve housing, and a discharge pipe 11 for spent motive liquid is connected to the opposite side thereof. An inlet pipe 12 for a control fluid is connected to the top of the valve housing. A suction pipe 13 for liquid to be pumped is connected to one side of the central body, and a discharge pipe 14 for pumped liquid is connected to the other side thereof. Inasmuch as the pump is particularly adapted to handle drilling mud used in drilling deep wells, and the motive liquid employed is usually water, the pumped liquid will for convenience be termed mud and the motive liquid will be referred to as water.

The two cylinders C and C' are identical, and hence a description of one will suffice for both. Referring to Fig. 4, the cylinder C comprises an outer shell 21 closed at its outer end by an end plate 22 bolted to a flange 23 welded to the outer end of the shell. A bolting flange 20 welded to the inner end of the shell is bolted to the side of the central body A. Supported concentrically within the shell 21 and coextensive therewith is a cylinder 31 of slightly smaller diameter than the shell 21, forming an annular channel 32 between the shell and cylinder. The outer end of the cylinder terminates short of the outer end of the shell, and is supported on an annular flange 33 integral with the end plate 22. The flange is formed with a plurality of slots 34 spaced about the periphery thereof to provide communication between the interior of cylinder 31 and the annular channel 32.

A central passage 38 and an outer concentric annular passage 39 are formed in each side of the central body A, forming an annular flange 40 between the two passages. The cylinder 31 is supported at 41 on the outer periphery of the flange 40, and the outer shell 21 is bolted to the central body A concentrically with the annular passage 39. The interior of cylinder 31 is thus in communication with the passage 38 and the annular channel 32 is in communication with the annular passage 39. The passages 38 and 39 communicate with other passages cored in the central body and leading to mud and water valves, as will be described hereinafter.

Pistons 45 and 45' are reciprocable in the cylinders 31 and 31' respectively and are secured to the ends of a piston rod 47 extending through a bore 48 in the central body into each cylinder. A stuffing box 49 seals the piston rod in fluid-tight relation to the central body.

Figure 6K:
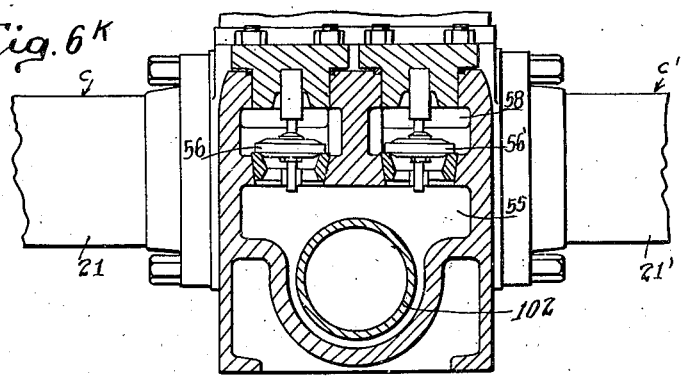
Fig. 6k is a vertical section taken approximately in the plane VI$^k$—VI$^k$ of Fig. 6d.
Figure 5G:
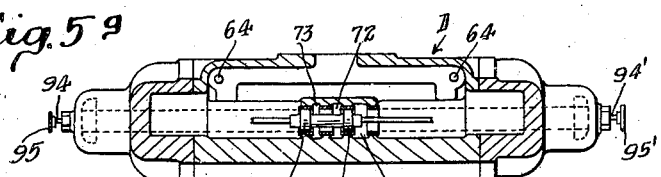
Fig. 5g is a sectional view, taken along the line V$^g$—V$^g$ of Fig. 5.
Figure 5F:
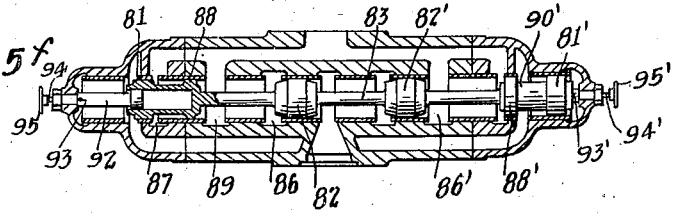
Fig. 5f is a sectional view, taken approximately in the plane V$^b$—V$^b$ of Fig. 5.
Figure 6H:
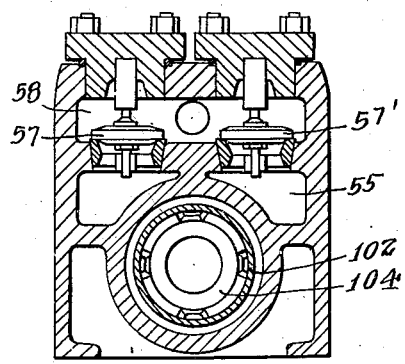
Fig. 6h is a vertical section taken approximately in the plane VI$^h$—VI$^h$ of Fig. 6d.

Formed within the central body is a mud suction chamber 55 communicating with the mud inlet pipe 13. As shown in Fig. 6, a mud suction valve 56 controls communication between chamber 55 and the annular passage 39 leading to the annular channel 32. A similar mud discharge valve 57 controls communication between passage 39 and a discharge chamber 58 leading to the mud discharge pipe 14, as shown in Fig. 5. It will be understood that both halves of the pump on opposite sides of a central transverse plane, represented by line V—V of Fig. 4, are identical, and that mud suction and discharge valves are also provided between chambers 55 and 58 and the annular passage 39' leading to the right-hand annular passage 32'. Since all parts on one side of line 5—5 are identical with those on the other side, those to the right of the central plane, as viewed in Fig. 4, will be designated by primed reference numerals corresponding to the unprimed numerals used to designate corresponding parts on the left side.

As shown in Fig. 4, the pistons are at the extreme left ends of their cylinders. On movement of the pistons to the right, mud will be forced out of the right-hand cylinder 31' ahead of piston 45', through slots 34' in the end plate 22' into the annular channel 32', thence through passage 39' to discharge chamber 58, the valve 57' being lifted by the excess pressure below it. At the same time, suction mud will be drawn by the left-hand piston into suction channel 55, past valve 56 into the left-hand passage 39, thence through the annular channel 32 and slots 34 into cylinder 31.

In order to reciprocate the pistons 45 and 45' in their cylinders, water under pressure is admitted to the cylinders alternately, under control of a reversing valve. As shown herein, the reversing valve is actuated hydraulically, and is controlled by a pilot valve which is mechanically operated at the end of each stroke of the main pistons. Inasmuch as the pilot valve operating mechanisms are identical, only one will be described. Referring to Figs. 4 and 7, a sleeve 61 is secured to the piston rod 47 adjacent the inner side of each piston. A finger 62 is fixed to the lower end of an operating shaft 63 so as to project into passage 38 in the path of the sleeve 61. The shaft 63 is journaled in the central body and projects into the valve housing D for engagement with an upper shaft section 64 journaled in the valve housing. A stuffing box 65 prevents leakage of water from passage 38 around the shaft and into the valve housing. A lever 66 is keyed to the upper end of shaft section 64, and projects laterally therefrom, the outer end of the lever engaging the end of a stem 67 secured to a balanced four-way pilot valve generally designated 71. From the foregoing it will be apparent that as either main piston 45 or 45' approaches the central body A the corresponding sleeve 61 or 61' engages the finger 62 or 62' and oscillates shaft 63 or 63' about its axis. Lever 66 or 66' is thus swung about the shaft axis and shifts the pilot valve.

The pilot valve controls the admission of water under pressure to the main valve. For reasons which will be explained hereinafter, the pressure of the water admitted to the pilot valve is relatively low as compared to that employed to reciprocate the main pistons, and will be referred to hereinafter as control water. The control water inlet 12, (Fig. 4), leads to a central chamber 72 selectively connectible with ports 73 and 73' by valves 74, 74'. Ports 73, 73' communicate with passages 75, 75' leading to cylinders 76, 76' at opposite ends of the main reversing valve assembly. Ports 73, 73' may also be selectively connected to exhaust chambers 77, 77' communicating with exhaust water outlet 11 (Fig. 5). In the position shown in Fig. 4 the pilot valve has been shifted to the left by the engagement of sleeve 61' with finger 62', and control water is admitted to passage 75 leading to cylinder 76 at the left end of the main valve. Port 73' is placed in communication with the exhaust chamber 77' to exhaust water from the right-hand cylinder 76' as the main valve moves to the right.

A pair of shuttle pistons 81, 81' are reciprocable in the cylinders 76, 76', and are connected to opposite ends of a double, four-way valve consisting of valves 82 and 82' connected by a stem 83. Each of the latter valves selectively establishes communication between a central pressure water chamber 84 and a port 85 or 85', or between the latter and an exhaust port 86 or 86'. Ports 85 and 85' communicate respectively with the central passages 38 and 38' leading to the interior of cylinders 31 and 31'. Exhaust ports 86 and 86' communicate with the exhaust water outlet 11 (Fig. 5).

The shuttle pistons 81, 81' also function as valves controlling communication between cylinders 76, 76' and ports 87, 87' leading to a surge cylinder as will be described hereinafter. An additional pair of valves 88, 88' control communication between ports 87, 87' and exhaust ports 89, 89' communicating with exhaust ports 86, 86', as shown in Figs. 8 to 11.

In order to control the rate of movement of the main valve, and particularly to check too rapid movement thereof, a dashpot arrangement is incorporated in each shuttle piston. Since the dashpots are identical, only that at the left end, as viewed in Fig. 4, will be described. The shuttle piston 81 and sleeve 90 are hollow to slidably receive a stem 91 secured in stationary position in the valve housing. The stem is bored axially at 92 and is provided with a lateral port 93 communicating with the bore 92. As the valve assembly moves to the left, the stem 91 moves into the hollow piston and sleeve, functioning as a plunger to force water outwardly through the bore 92 and lateral port 93. The rate of escape of water from port 93 is controlled by a needle valve formed on the inner end of a valve stem 94 threaded into the bore 92. A handle 95 is provided for rotating the stem 94 and thus moving the needle valve axially of the bore to vary the effective size of the lateral port 93.

As stated previously, surge means in the form of a double surge piston and cylinder arrangement is provided to insure continuous flow, at steady pressure, of pressure water, discharge water, discharge mud, and suction mud. To accomplish this result, the movement of the surge pistons is correlated to that of the main pistons in such a way that during reversal of the stroke of the main pistons the combined displacement of main pistons and surge pistons is equal to the displacement of the main pistons during the stroke of the latter.

Referring to Fig. 5, a pair of alined surge cylinders 101 and 102 are mounted in the central body A, and extend transversely of the main cylinders below the piston rod 47. Pistons 103 and 104 are reciprocable in the cylinders 101 and 102, respectively, and are connected by a piston rod 105 extending through a partition 106 and sealed thereto by a stuffing box 107. It will be seen from a comparison of Figs. 4 and 5 that the surge cylinders and pistons are of the same diameter as the main cylinders and pistons, and that the piston rod 105 is of the same diameter as the piston rod 47. Consequently if the same relative pressures are exerted on opposite sides of the surge pistons as are applied to the main pistons, the displacements will be equal.

The cylinder 101 on the inner side of piston 103 is in communication with a vertically extending fluid passage 111 connecting with the central pressure water passage 84, whereby the inner side of piston 103 is constantly exposed to the pressure of the power liquid employed to reciprocate the main pistons. The outer end of cylinder 101 is in open communication with the mud discharge chamber 58, thus constantly exposing the outer side of piston 103 to discharge pressure. Since the water pressure exceeds the mud pressure, it is apparent that the piston 103 would be moved to the extreme left and held in that position unless an overbalancing pressure is applied to augment the mud discharge pressure. For this purpose, the relatively low pressure control water admitted through inlet pipe 12 is admitted to the right-hand surge cylinder 102 on the inner side of piston 104, to augment the discharge mud pressure exerted on the outer side of piston 103. The pressure of the control water may vary considerably, the essential requirement being that it exceed the difference between the power water pressure and the discharge mud pressure. If the power water is supplied by a multi-stage centrifugal pump, the control water may conveniently be bled from the first stage of the pump.

A fluid passage 112 extends parallel to the passage 111, and is connected at one end to the inner end of surge cylinder 102, and at the other end to ports 87 and 87'. The outer end of cylinder 102 is in open communication with the mud suction pipe 13 and suction chamber 55.

The movement of the surge pistons is correlated to that of the main pistons by exerting the control water pressure against piston 104 during the stroke of the main pistons whereby the surge pistons are held at the right-hand end of their cylinders, as viewed in Fig. 5, and by bleeding the control pressure from cylinder 102 as the main pistons approach the end of their stroke, thereby permitting the high water pressure exerted on piston 103 to move the surge pistons to the left, the movements of the main and surge pistons during reversal supplementing each other to produce a combined effect equal to that of the main pistons during their stroke. The admission of control water to cylinders 102 and its release therefrom is controlled by the shuttle valves 81, 88 and 81', 88'. As shown schematically in Figs. 8 to 11, the fluid passage 112 of Fig. 5 is in open communication with ports 87 and 87', one of the latter being opened to the pilot valve when the main valve is at either end position, and both being closed while the main valve is moving from one position to the other. The control pressure is initially released immediately upon shifting the pilot valve, since the passage 75 or 75' through which control water is admitted to shuttle cylinder 76 or 76' and to surge cylinder 102 in one position of the pilot valve, is opened to the exhaust pipe 11 when the pilot valve is shifted.

The movement of the surge piston 193 to the left as the result of release of the control pressure from piston 104 displaces mud from the left end of cylinder 101, thus preventing any decrease in the discharge pressure while the main pistons are reversing. High pressure water entering cylinder 101 to the right of piston 103 prevents interruption of the flow of this fluid while the main valves 82, 82' are passing dead center. Also, while the main valves are moving from one end position to the other, ports 87 and 87' are opened to communication with discharge ports 89 and 89', respectively, and the water in surge cylinder 102 to the left of piston 104 is bled to the exhaust pipe 12, the piston 104 being moved in unison with piston 102 by the rod 105. The discharge of water from the pump is thus continued during reversal of the main pistons. Movement of piston 104 to the left also draws in mud through the suction pipe 13, so that the flow of suction mud is continuous and steady.

An indicator rod 115 (Fig. 5) may be secured to the piston 103 to extend through a stuffing box 116 in the closure plate 117, whereby the movement of the surge pistons may be observed.

The mode of operation of the device will be understood from a study of Figs. 8 to 11, wherein the pump is illustrated schematically and the parts are shown in five different positions during a cycle. In Fig. 8 the pilot valve is shifted to the right, admitting control water from inlet 12 to the right-hand end of the main valve assembly through port 73' and passage 75'. The main valve is consequently at the extreme left-hand position, establishing communication between high pressure water inlet 10 and the left-hand main cylinder 31 through passage 85, and causing the main pistons 45 and 45' to move to the left. Mud is being displaced from cylinder 31 through discharge valve 57, and suction mud is being drawn into the right-hand cylinder 31' through suction valve 56'. At the same time water is being displaced from cylinder 31' ahead of piston 45' through passage 85', discharge port 86', and water outlet 11. In this position shuttle piston 81' is to the left of port 87', admitting control water to passage 112 and to surge cylinder 102 to exert a counterbalancing pressure on piston 104. The high water pressure exerted against surge piston 103 from passage 111 is thus exceeded by the combined discharge mud pressure in discharge chamber 53 exerted against the outer face of piston 103 and the control pressure exerted against piston 104, and the surge pistons are held in the position shown in Fig. 8.

Referring to Fig. 8a, the main pistons have almost reached the end of their stroke, and the pilot valve has been tripped to its left-hand position by the trip mechanism shown in Figs. 4 and 7. One immediate effect of the shifting of the pilot valve is to release the control pressure from surge cylinder 102 through the pilot valve exhaust chamber 77', allowing the high water pressure exerted against surge piston 103 to start the latter moving outwardly. At the same time, control water is admitted through passage 75 to the left end of the main valve assembly, causing the latter to move to the right. Referring to Fig. 9, prior to the closing of port 87' by valve 81', valve 88 moves to the right of port 89, establishing communication between the latter and port 87 to exhaust the control water from surge cylinder 102 as the surge pistons move upwardly. Further movement of the main valve assembly to the right causes valve 81' to clear port 87', establishing communication between the latter and exhaust port 89', providing additional fluid passage area for exhausting control water from cylinder 102.

In Fig. 10 the main valve assembly is in mid-position, with both passages 85, 85' leading to the main cylinders 31, 31' closed. In this position the maximum exhaust area for control water from surge cylinder 102 is provided and the surge pistons are moving at the same speed attained by the main pistons during the major part of their stroke. The displacement of fluids by the main pistons are ceased entirely at this time, and has been replaced by the displacement by the surge pistons.

Further movement of the main valve assembly to the position shown in Fig. 11 results in establishing communication between high pressure water inlet 10 and passage 85' leading to the right-hand cylinder 31', and between the left-hand cylinder 31 and exhaust port 86 through passage 85. The main pistons are thus moved to the right, causing displacement of mud from cylinder 31' through discharge valve 57' and drawing in of mud to cylinder 31 through suction valve 56. Valve 88' has closed communication between ports 87' and 89', and valve 81 has closed communication between ports 87 and 89, thus cutting off escape of control water from cylinder 102. Valve 81 has opened port 87 to communication with the pilot valve, admitting control water through passage 112 to cylinder 102, thus causing the surge pistons to retreat to their former position. When the main pistons approach the opposite ends of their cylinders, the pilot valve will be tripped back to the right, and the above-described sequence will be repeated, except that conditions on opposite sides of a central transverse plane will be reversed.

In Fig. 12 is illustrated schematically a slightly modified form of the invention, the mode of operation of which is, however, substantially the same as that of the previously described form.

Inasmuch as the main cylinders and pistons and the surge cylinder and pistons are substantially the same as in the first form, and in view of the fact that they are illustrated more or less schematically, a brief description thereof will suffice.

Main cylinders 131 and 131' are secured to opposite sides of a central body 132, and the cylinders have secured to their outer ends valve chambers 133, 133'. Mud suction valves 134 and 134' and mud discharge valves 135 and 135' are mounted in the valve chambers, and suction valves being disposed in inlet passages 136, 136' leading from a mud section header 137. A suction pipe 138 supplies mud from a suitable source. A mud discharge header 139 connects the valve chambers on the discharge side of valves 135 and 135', and a mud discharge pipe 140 leads to the point of use. Main pistons 145 and 145' are interconnected by a piston rod 146 for simultaneous reciprocation in cylinders 131 and 131', respectively, the piston rod 146 extending through a partition 147 in the central body 132.

Sleeves 148, 148' are formed on the inner sides of the pistons, and are provided with tapered cam surfaces 149, 149' adapted to engage plungers 150 and 150', respectively, as each piston approaches the inner limit of its stroke. The plungers are reciprocable in transversely extending bores 151, 151' formed in the central body 132, the outer ends of the plungers engaging bellcrank levers 152, 152' pivotally mounted on a valve housing 153. A pilot valve generally indicated at 156 is reciprocable in the valve housing, and comprises a pair of balanced valves 157, 157' mounted on a valve stem 158. The ends of the valve stem are engaged by the bellcrank levers 152, 152', whereby the valves are shifted from one position to the other at the end of each stroke of the main pistons 148 and 148'. Valve 157 controls communication between a central water chamber 161 and a port 162, and between the latter and a discharge port 163. Valve 157' similarly controls communication between central chamber 161 and a port 162', and between the latter and a discharge port 163'.

A main reversing valve, generally indicated at 168, comprises a pair of balanced valves 167, 167', and a pair of shuttle pistons 168, 168' connected at opposite sides of the valves and reciprocable in cylinders 169, 169'. Valve 167 controls communication between a central chamber 171 and a port 172 and between the latter and a discharge port 173, while valve 167' similarly controls communication between the central chamber 171 and a port 172' and between the latter and a discharge port 173'. Ports 172 and 172' are connected to water passages 175 and 175' respectively, opening into the main cylinders 131, 131'. Discharge ports 173, 173' communicate with a water discharge outlet 176 leading back to the source of water. A high pressure water inlet 177 communicates directly with the central chamber 171 in the main valve and with the central chamber 161 in the pilot valve.

Ports 162, 162' in the pilot valve communicate with shuttle cylinders 169, 169' through passages 179, 179' to admit pressure water alternately to the shuttle cylinders to shift the main valve at the end of each stroke of the main pistons.

In order to provide uniform flow of high pressure water, exhaust water, suction mud, and discharge mud, there is provided a double surge piston arrangement similar to that of the previously described form. It consists generally of a high pressure surge cylinder 182, a low pressure surge cylinder 183, a piston 184 in cylinder 182 and a piston 185 in cylinder 183, the pistons being connected by a piston rod 186 extending through a partition 187 separating the two cylinders. High pressure water is constantly admitted to the inner end of cylinder 182 through a conduit 188 extending from the high pressure water inlet 177 to a port 189 in the partition 187. The outer end of cylinder 182 is in communication with the mud discharge through a pipe 190.

The outer end of low pressure surge cylinder 183 is in communication with the mud suction header 137 through a pipe 191. In order to apply a control pressure to the inner side of piston 185 to supplement the discharge mud pressure on piston 184, as in the previously described form, a control pressure pipe 195 leads from a suitable source of water at relatively low pressure to a valve chamber 196. A port 197 in the chamber communicates with the cylinder 183 through a port 198 in the partition 187. A discharge port 199 in the valve chamber is normally closed to communication with port 197 by a valve 200. The valve is normally held against its seat by a compression spring 204 interposed between a piston 205 and a cap 206 threadedly connected to a cylinder 207 in which the piston 205 is reciprocable.

In order to lift the valve 200 from its seat and release the control pressure water from cylinder 183 during reversal of the stroke of the main pistons, high pressure water is admitted to the cylinder 207 beneath the piston 205 during the reversal of the main valve 166. This is accomplished by a control valve generally indicated at 211. A double-faced valve 212 is connected to the main valve 166 by a stem 213, whereby movement of the main valve causes the valve 212 to shift from one end of its housing 214 to the other end. Valve seats 215 and 216 are formed at opposite ends of the valve housing, whereby when the valve is in its extreme right-hand position a high pressure water inlet pipe 217 is closed, and when the valve is at the opposite end of the housing the interior thereof is sealed off from a pipe 218 leading to the cylinder 207. The periphery of the central portion of the valve 212 is cut away at intervals to permit flow of pressure water past the valve while in positions intermediate the two end positions.

The mode of operation of the surge control is as follows: During the stroke of the main pistons the main valve 166 will be at one extreme position or the other, and consequently the control valve 212 will be seated either against seat 215 or seat 216. In either event communication between conduits 217 and 218 is closed. In the absence of fluid pressure beneath piston 205, the spring 204 is of sufficient strength to hold the valve 200 on its seat against the relatively low pressure exerted thereon by the control water admitted to the valve chamber 196 through conduit 195. Consequently the control pressure will be applied to the inner face of surge cylinder 185, this pressure supplementing the discharge mud pressure on the outer face of piston 184 to exceed the high water pressure on the inner face of piston 184. The surge pistons are thus held in retracted position during the stroke of the main pistons.

The tripping of the pilot valve by one of the cams 149 or 149' near the end of the stroke causes reversal of the main valve 166. During such reversal the control valve 212 is moved from one end of its housing to the other. The recesses 220 formed in the valve body permit flow of high pressure water from inlet 177 through conduits 188 and 217, through the valve chamber 214 to conduit 218 and thence to the cylinder 207 beneath piston 205. The valve 200 is thus lifted from its seat and the control pressure water is released from cylinder 183 through discharge port 199 which communicates with discharge port 176. The surge pistons are thus caused to move in a direction to continue the flow of discharge mud, pressure water, suction mud, and exhaust water during reversal of the main valve.

As soon as the main valve reaches the end of its travel, the control valve 212 will be seated against seat 215 or 216, cutting off communication between conduits 217 and 218. The pressure of the water trapped in conduit 218 and cylinder 207 is relieved through a small bleeder opening 225 in the base of the cylinder 207, allowing the spring 204 to return valve 200 to its seat. The control pressure water entering through conduit 195 is again forced into cylinder 183 and the surge pistons are returned to their original position.

Fig. 12a illustrates a modification of the arrangement shown in Fig. 12, whereby the separate control fluid is eliminated. This is accomplished in Fig. 12a by the provision of a valve-controlled bleeder by-pass from the high pressure side to the low pressure side of the partition separating the surge cylinders.

Referring to Fig. 12a, the component parts of the surge cylinders and pistons, the spring-loaded release valve, and the control valve connected to the main reversing valve are identical with those of Fig. 12, and are designated by primed reference characters corresponding to those designating corresponding parts in Fig. 12. The structure shown in Fig. 12a differs from that of Fig. 12, however, in the manner of admitting control liquid to the low pressure surge cylinder 183' on the inner side of piston 185'. In this instance a bleeder passage 195' extends through the central partition 187' to admit motive liquid at a slow rate from the lower end of high pressure cylinder 182', the rate of flow through the bleeder passage being suitably controlled by a needle regulator valve 196'. This arrangement eliminates the necessity of a separate control liquid such as is provided through conduit 195' of Fig. 12.

In the operation of the form of the invention shown in Fig. 12a, during the normal stroke of the main pistons valve 200' is held on its seat by spring 204', preventing escape of fluid from the upper end of cylinder 183'. High pressure motive liquid is constantly admitted to the lower end of cylinder 182' through conduit 188', and a small amount bleeds through the passage 195' in partition 187' into the upper end of cylinder 183', to apply a force to piston 185' augmenting the force applied to piston 184' by the discharge mud pressure sufficiently to retract the surge pistons and hold them in retracted position.

During reversal of the main valve, the control valve 212' (which is connected to the main valve by stem 213' as in Fig. 12) admits high pressure motive liquid from line 217' to the cylinder 207' beneath the piston 205'. The valve 200' is thereby lifted from its seat, permitting the escape of liquid from the upper end of cylinder 183'. The relief of this pressure permits the surge pistons to move upwardly, as viewed in Fig. 12a, to continue the flow of discharge mud, pressure water, suction mud, and exhaust water during reversal of the main valve.

In Fig. 13 is illustrated schematically a still further modified form of the invention. The independent control of the surge pistons by the application and release, in synchronism with the actuation of the reversing valve, of a relatively low control pressure applied to the surge pistons in opposition to the motive liquid pressure, is also a feature of this form of the invention. The valve arrangement for controlling the actuation of the main valve and for controlling the application and release of the control pressure is different, however, from that shown in the two previously described forms.

The main cylinders 231 and 231' and their pistons 232 and 232' connected by piston rod 233 are generally similar to those previously described. Mud suction valves 234, 234' control admission of mud to the cylinders from a suction header 235 having a mud inlet 236, while mud discharge valves 237, 237' control the discharge to a discharge header 238 having a mud outlet 239.

Surge cylinders 245 and 246 contain surge pistons 247 and 248, respectively, connected by a piston rod 249. As in the two previously described forms, the outer ends of the surge cylinders 245 and 246 are connected, respectively, to the discharge header 238 and the suction header 235, while the inner ends of the cylinders 245 and 246 are connected respectively to conduits 250 and 251. Conduit 250 is connected to the source of high pressure water, while conduit 251 is connected, through valves to be later described, with the source of control pressure water. As in the previously described forms, the application and release of the control pressure controls the movements of the surge pistons.

A balanced four-way main valve controls the admission of high pressure water to the main cylinders, and comprises valves 261 and 261' connected by stem 262. Shuttle pistons 263 and 263' are connected by rods 264, 264' to opposite ends of the valves, and are reciprocable in shuttle cylinders 265, 265' by control pressure water admitted alternately to opposite ends to shift the valves 261, 261' from one position to the other. In the position shown, high pressure water is admitted through inlet 270 to port 271' leading to cylinder 231', while spent pressure water is exhausted from cylinder 231 through ports 271 and 272 to exhaust outlet 273. When the valves are shifted to the left, valve 261 will move to the left of port 271, admitting high pressure water to cylinder 231, and valve 261' will establish communication between ports 271' and 272' to exhaust water from cylinder 231'.

Control water at relatively low pressure is admitted through an inlet 280 communicating with fluid passages 281 and 281' leading from the inlet to pilot valves 282, 282'. It will be noted that in this form of the invention separate pilot valves are provided, only one being actuated at the end of each stroke of the main pistons. Each pilot valve must therefore control the actuation of the main reversing valve and the admission and exhaust of control water to the surge cylinder. Referring to the left-hand pilot valve 282, a valve stem 283 extends through a transverse bore in the central body and projects into the path of a cam surface 284 formed on a sleeve 285 connected to the inner side of the piston 232. The fluid passage 281 leading from the control water inlet 280 communicates with the head 286 of the valve, and a branch passage 287 leads to a port 288. When the valve is in the lower position shown, port 288 is in communication with a port 289 leading to a port 288' controlled by the other pilot valve 283'. When the latter valve is in its lower position port 288' communicates with a port 289' leading to the surge cylinder 246 through passage 251. Hence it will be evident that when both pilot valves are in their lower positions, control water will be admitted to surge cylinder 246 through inlet 280, passage 281, ports 288 and 289, ports 288' and 289', and passageway 251. When either pilot valve is raised by its respective cam 284 or 284' into the position in which valve 282' is shown, the admission of control water to surge cylinder 245 is cut off.

It will be apparent that the main valves 261 and 261' must be shifted to the right, as shown, in order to admit high pressure water to the right-hand main cylinder. Consequently the right-hand pilot valve 282' must control admission of control water to the left-hand shuttle cylinder 265 to shift the main valve to the right. For this purpose a port 295' is provided below the valve seat 296' of valve head 286', communicating with a passage 297' leading to shuttle cylinder 265. When pilot valve 282' is raised, the valve head 286' is lifted from its seat to admit control water to port 295', passage 297', and shuttle cylinder 265. At the same time the left-hand pilot valve in its lower position established communication between a port 295 communicating with a passage 297 leading to the right-hand shuttle cylinder, and a discharge port 298 communicating with a discharge passage 299 leading to discharge outlet 273, to exhaust the right-hand shuttle cylinder 265' as the main valve and shuttle pistons move to the right.

The lifting of pilot valve 282' also establishes communication between port 289' and a discharge port 298' communicating with a branch discharge passage 299' leading to the main discharge passage 299, thus releasing the control water from surge cylinder 245 and permitting the surge pistons to move upwardly.

From the foregoing it will be seen that the lifting of pilot valve 282' admits control water to the left-hand shuttle cylinder to move the main valve to the right, and that during the time the pilot valve is raised control water is cut off from the surge cylinder 245, and the latter is exhausted to the exhaust passage. Movement of the main pistons to the right releases the pilot valve, whereupon it moves to its lower position, reestablishing communication between ports 288' and 289' to admit control water to surge cylinder 245 to return the surge pistons to their original position, the discharge port 298' being cut off from communication with port 289' and being opened to communication with port 295' to release the control water from the left-hand shuttle cylinder 265.

As the main pistons approach the end of their stroke to the right, the left-hand pilot valve 282 is engaged by cam surface 284 and lifted. The lifting of valve head 286 admits control water from passage 281 to passage 295 leading to the right-hand shuttle cylinder 265', to shift the main valve to the left. At the same time, port 288 is closed, cutting off the control water from surge cylinder 245, and communication is established between port 289 and exhaust port 298 to discharge water from the surge cylinder 245 to the discharge outlet 273. Movement of the main pistons to the left, after reversal of the main valve, releases the pilot valve 282 and allows it to return to its lower position.

It will be apparent from the foregoing description of this form of the invention and its mode of operation that it embodies the same essential features of the three previously described forms, differing therefrom chiefly by the provision of two independent pilot valves individually actuated by their respective cam sleeves, and each controlling the actuation of the main valve and of the surge pistons. The dashpots incorporated in the shuttle pistons of Fig. 4, in the form first described, may also be provided in this form as well as in that shown in Fig. 12, whereby the rate of movement of the main reversing valve may be suitably regulated.

Fig. 14 illustrates a still further modification of a surge control system applicable to a simplex hydraulic pump shown, the pump and the connections thereto being the same as in Figs. 12 and 12a.

Referring to Fig. 14, a high pressure surge cylinder 302 and a low pressure surge cylinder 303 are connected by a central partition 304 through which extends a piston rod 305 connected at opposite ends to pistons 306 and 307. The cylinders 302 and 303 are connected respectively at their outer ends to a mud discharge pipe 308 and a mud suction pipe 309 communicating respectively with the discharge and suction headers of the pump.

In this form of the invention, the opposite faces of the high pressure surge piston 306 are exposed to motive liquid and discharge mud at equal pressures during the normal stroke of the main pistons. In this respect this form distinguishes from each of the previously described forms, wherein the motive liquid pressure in the surge cylinder always exceeds the discharge mud pressure. In the present instance, the pressure of these liquids is equalized during the normal stroke of the main pistons, and during the reversal period the full motive liquid pressure is admitted to the lower end of cylinder 302 to actuate the surge pistons.

The motive liquid and discharge mud pressures in cylinder 302 are equalized by means of a pressure regulator valve generally designated 312. This valve comprises a valve 313 connected to a valve stem 314 to which is connected a piston 315 reciprocable in a cylinder 316. The valve 313 controls admission of high pressure motive liquid from conduit 317 to the lower end of surge cylinder 302. One face 318 of piston 315 is exposed to the motive liquid in cylinder 302, while the other face 319 of the piston is exposed to the discharge mud pressure through a conduit 320. By this arrangement the piston 315 and the valve 313 connected thereto adjust themselves to establish a pressure balance between the motive liquid and the discharge mud. In order to avoid the possibility of valve 313 seating and being held on its seat by the motive liquid pressure, a small amount of motive liquid is constantly bled from cylinder 302 through a bleeder passage 322, the discharge rate being suitably regulated by a manually adjustable needle valve 323. The discharged liquid returns through a conduit 324 to the source of motive liquid.

During the reversal of the main valve of the pump, the regulator valve 313 is opened wide to apply the full pressure of the motive liquid to the piston 306. To effect the movement of valve 313 to full open position, a second piston 326 is connected to the valve by a stem 327, and is reciprocable in a cylinder 328 in axial alignment with cylinder 316. High pressure motive liquid is admitted to the inner face of piston 326 through a conduit 329 extending between the cylinder 328 and a valve 330. The latter is interposed between cylinder 328 and the source of motive liquid to admit motive liquid to cylinder 328 only during reversal of the main reversing valve of the pump. A valve stem 331 is connected to one end of the main reversing valve in a manner similar to the connection of valve stem 213 to the main valve 166 of Fig. 12. A pair of valves 332 and 333 are connected to the stem 331 to be reciprocated each time the main valve is reversed. In the position shown in Fig. 14, the main valve is reversing and is in mid-position, and at this time the valves 332 and 333 are disposed on opposite sides of a motive liquid inlet 334 and branch passages 335 and 336 leading to the conduit 329. As the main valve approaches the right-hand end of its reversing stroke, the valve 332 closes the inlet port 334 and simultaneously establishes communication between passage 335 and an exhaust conduit 337, thereby relieving the piston 326 of the pressure of the motive liquid and permitting the valve 313 to re-establish equalized pressure on opposite sides of surge piston 306. Simultaneously, when the main valve moves from right to left, valve 332 first uncovers port 334 to admit motive liquid through passage 336 and conduit 329 to cylinder 328, and finally the valve 333 closes the inlet port 334 and establishes communication between passage 336 and an exhaust conduit 338.

The operation of this form of the invention is self evident from the foregoing description. It will be noted that the area of the inner face of the piston 306 is less than that of the outer face by an amount equal to the cross-sectional area of the piston rod 305. Consequently, with equal unit pressures on opposite sides of the piston the total force exerted by the mud will exceed that exerted by the motive liquid, and consequently the piston will be retained in retracted position during this phase of operation. Also, it may be noted that the regulator valve does not effect exact equalization of pressures, because of the slightly reduced piston area 318 due to the piston rod 314. However, because of the constant bleeding of motive liquid from the lower end of cylinder 302 through the bleeder passage 322, the motive liquid pressure in cylinder 302 will be less than that in the cylinder 316 of the regulator valve, and consequently the total force exerted on the piston 306 by the mud pressure will exceed that exerted by the motive liquid. This difference in opposing forces on opposite faces of piston 306, together with the suction exerted on the outer face of piston 307 by the negative pressure in the suction header of the pump, is sufficient to move the pistons to their retracted position during the stroke of the main pistons. During main valve reversal periods the pressure regulation is interrupted by admission of motive liquid to cylinder 328, causing the valve 313 to be opened wide to admit the motive liquid at full pressure to the surge of cylinder 302.

It will be obvious that the surge control system of Fig. 14 coacts with the main pistons of the pump in the same timed relation as in the previously described forms, the only difference residing in the mode of retaining and releasing the surge pistons.

It will also be obvious that the control arrangements of Figs. 12 to 14 may be embodied in a pump constructed as in Figs. 1 to 7, inasmuch as all of the fluid passages communicate with the upper surface of the central body A to which the valve housing D is secured. Each of the schematic valve arrangements of Figs. 12 to 14 is capable of being embodied in a valve housing attachable to the central body A of Figs. 1 to 7.

In each of the embodiments described, the pressure fluctuations normally incidental to the reversal of the stroke of a simplex hydraulic pump have been entirely eliminated, not only on the high pressure side but also on the low pressure side. The control of the surge pistons independently of pressure variation is responsible for this elimination of pressure fluctuations and makes possible a smoothness of operation unheard of heretofore in this type of pump. By suitable regulation of the control pressure and proper adjustment of the dashpots controlling the speed of travel of the main valve assembly, the length of the reversal period may be suitably regulated in accordance with the piston speed of the main pistons.

A pump constructed in accordance with this invention is particularly adapted to withstand the severe operating conditions imposed on mud pumps for handling drilling mud in connection with drilling deep wells. These conditions are set forth in the copending application of Aladar Hollander, Serial No. 197,139, patented January 23, 1940, No. 2,187,972, referred to above, and will not be repeated here. It will be apparent, however, that the constructions described above embody all of the features of the pump disclosed in the aforementioned application which render it admirably suited to this service, and, in addition, the improved surge control is especially advantageous when operating at the high pressures required in deep well drilling. Irrespective of the pressure, the operation is smooth and characterized by the absence of vibrations resulting from pressure fluctuations. When operated by pressure water supplied by a centrifugal pump, the balanced piston arrangement results in the operating characteristics of the centrifugal pump being transmitted to the drilling mud unaffected by any conflicting characteristics of the mud pump. Consequently, when operating at relatively low pressure the mud volume will be relatively high, while at high pressure the piston strokes will be long, relatively slow, powerful strokes with correspondingly longer reversal periods during which the flow of all four liquids will be continued unchanged. The result is a smooth, steady discharge of mud and a complete absence of vibration due to water hammer in the driving liquid. This latter feature is especially advantageous if the driving fluid is also used to operate other hydraulic devices.

Having fully described the preferred embodiments of this invention, it is to be understood that I do not limit myself to the exact construction herein set forth, which may obviously be varied in detail without departing from the spirit of this invention, but only as set forth in the appended claims.

I claim:

1. In combination: a fluid-actuated pump responsive to motive fluid under pressure for delivering a pulsating flow of pump fluid, said pump having motive fluid inlet and outlet connections and pump fluid inlet and outlet connections; piston means having a face communicating with said pump fluid outlet connection and movable in a first direction to absorb pump fluid from said pump fluid outlet connection, and movable in the opposite direction to discharge pumped fluid into said pump fluid outlet connection, and means for applying, only during intervals of minimum flow of said pump, a force to said piston means opposing and exceeding the force normally exerted by pump fluid thereon during intervals of maximum flow of said pump, to move the piston in said opposite direction and supplement the pump discharge during said intervals of minimum flow, said piston means moving in said one direction under force of discharge fluid to absorb discharge fluid from said pump during intervening intervals.

2. In combination: a fluid-actuated pump responsive to motive fluid under pressure for delivering a pulsating flow of pump fluid, said pump having motive fluid inlet and outlet connections and pump fluid inlet and outlet connections; piston means having a face communicating with said pump fluid outlet connection and movable in a first direction to absorb pump fluid from said pump fluid outlet connection and movable in the opposite direction to discharge pump fluid into said pump fluid outlet connection, means for constantly urging said piston means in said opposite direction with a force greater than the reactive force exerted on the piston means by the pump fluid to which it is exposed, and other means for applying, only during intervals of maximum flow of pump fluid from said pump, a force to said piston means supplementing the force exerted by pump discharge fluid thereon, said other means being rendered inactive during intervals of minimum flow of pump fluid from said pump, whereby said piston means moves in said first direction to absorb a portion of the discharge of said pump during intervals of maximum flow and moves in said opposite direction to supplement the discharge of the pump during intervening intervals.

3. A pump as described in claim 2, in which said means for urging said piston means in said opposite direction applies a force substantially proportional to the pump discharge pressure.

4. In combination: a fluid-actuated pump responsive to motive fluid under pressure for delivering a pulsating flow of pumped fluid, said pump having motive fluid inlet and outlet connections and pump fluid inlet and outlet connections; surge piston means having a first face communicating with said pump fluid outlet connection and movable in a first direction to absorb pump fluid from said pump fluid outlet connection and movable in the opposite direction to discharge pump fluid into said pump fluid outlet connection, said surge piston means having a second, opposing face communicating with said motive fluid inlet connection, said motive fluid constantly applying a force to said surge piston means greater than the opposing and reactive force exerted thereon by the pump discharge fluid to which it is exposed, and other means for applying, only during intervals of maximum flow of pump fluid from said pump, a force to said surge piston means supplementing the force exerted by pump discharge fluid thereon, said other means being rendered inactive during intervals of minimum flow of pumped fluid from said pump, whereby said surge piston means moves in said first direction to absorb a portion of the discharge of said pump during intervals of maximum flow, and moves in said opposite direction to supplement the discharge of the pump during intervening intervals.

5. Apparatus as described in claim 4, in which said pump comprises main cylinder means and main piston means reciprocable therein, said main piston means having oppositely directed faces exposed to motive fluid and pump fluid, respectively, in which the area of the main piston face exposed to motive fluid bears the same ratio to the area of the main piston face exposed to pump liquid as the ratio of the area of said second opposing face of said surge piston means to said first face of said surge piston means.

6. Apparatus as described in claim 4, in which said surge piston means has an additional face oppositely directed from said first-mentioned face and communicated with said pump fluid inlet connection for equalizing flow of pump fluid through said inlet connection.

7. In a hydraulic pump, a pair of main cylinders, a main piston reciprocable in each cylinder, said pistons being interconnected for reciprocation in unison, suction and discharge connections to said pump, inlet and exhaust connections for motive liquid for actuating said pump, a surge cylinder, a surge piston therein, said surge piston having opposing faces exposed to the pressure of said pump discharge and of said motive liquid respectively, means to apply an auxiliary control pressure to said surge piston to supplement said discharge pressure, and means to release said control pressure during reversal of said main pistons.

8. In a hydraulic pump, a pair of main cylinders, a main piston reciprocable in each cylinder, said pistons being interconnected for reciprocation in unison, suction and discharge connections to said pump, inlet and exhaust connections for motive liquid for actuating said pump, reversing valve mechanism for controlling the admission and exhaust of motive liquid, a surge cylinder, a surge piston therein, said surge piston having opposing faces, one exposed to the pressure of said motive liquid and the other exposed to the pressure of said pump discharge, means to apply an auxiliary control pressure to said surge piston to supplement said discharge pressure, and means actuated at the end of each stroke of said main pistons for actuating said reversing valve mechanism and for releasing said auxiliary control pressure.

9. A hydraulic pump comprising: a pair of main cylinders, a main piston reciprocable in each cylinder, said pistons being interconnected for reciprocation in unison, suction and discharge connections to said pump, inlet and exhaust connections for motive liquid for actuating said pump, reversing valve mechanism for controlling the admission and exhaust of motive liquid, a pair of surge cylinders, a surge piston reciprocable in each surge cylinder, said surge pistons being interconnected for reciprocation in unison, one of said surge pistons being exposed on one side to the motive liquid pressure and on the other side to the pump discharge pressure, means to apply an auxiliary control pressure to one side of the other surge piston to oppose the motive liquid pressure applied to the first surge piston, and means actuated at the end of each stroke of the main pistons for actuating said reversing valve mechanism and for releasing said auxiliary control pressure.

10. A pump as described in claim 9, in which said auxiliary control pressure is less than the pressure of said motive liquid.

11. A pump as described in claim 9, in which said main pistons are interconnected by a piston rod reducing the effective areas of the inner faces of said two pistons and said motive liquid is applied to said inner faces of said main pistons and in which said surge pistons are also interconnected by a piston rod reducing the effective areas of the face of said surge piston exposed to motive liquid.

12. A pump as described in claim 8, in which said auxiliary control pressure is released only during reversal of said reversing valve mechanism.

13. A pump as described in claim 8, in which said last-mentioned means includes a pilot valve, trip mechanism actuated by movement of said main pistons for reversing said pilot valve, and an auxiliary valve mechanism connected to said reversing valve mechanism for controlling the application and release of said control pressure to said surge piston.

14. A pump as described in claim 8, in which said last-mentioned means comprises a pilot valve actuated by movement of the main pistons with means responsive to movement of the pilot valve for actuating the reversing valve, and means including both the pilot valve and the reversing valve, for controlling application of said auxiliary control pressure to said surge piston.

15. A hydraulic pump as defined in claim 8, in which said reversing valve mechanism comprises a fluid-actuated main valve, and in which said last-named means includes a pilot valve, a control pressure fluid inlet to said pilot valve, fluid connections from said pilot valve to said main valve whereby the latter is actuated by said control pressure fluid, and auxiliary valve mechanism connected to said main valve for controlling the admission to and release of control pressure fluid from said surge piston in synchronism with the actuation of said main valve.

16. A hydraulic pump as defined in claim 8, in which said reversing valve mechanism comprises a fluid-actuated reciprocating main valve controlling the admission and exhaust of motive liquid to said main cylinders, a shuttle piston connected to each end of said main valve and reciprocable in a shuttle cylinder, a pilot valve, a control pressure fluid inlet to said pilot valve, fluid connections from said pilot valve to said shuttle cylinders, trip mechanism actuated by one of said main pistons at the end of each stroke thereof for reversing said pilot valve to alternately admit control pressure fluid to said shuttle cylinders to reverse said main valve, and fluid connections between said shuttle cylinders and said second surge cylinder, said last-named connections being controlled by said shuttle pistons to control the application and release of control pressure fluid to said surge piston.

17. A hydraulic pump as defined in claim 8, in which said reversing valve mechanism comprises a fluid-actuated main valve, and in which said last-named means includes a pilot valve, a control-pressure fluid inlet to said pilot valve, fluid connections from said pilot valve to said main valve whereby the latter is actuated by said control-pressure fluid under control of said pilot valve, and auxiliary valve mechanism for controlling the admission to and release of control pressure fluid from said surge piston in synchronism with the actuation of said main valve.

18. A pump as described in claim 8, in which said last-mentioned means comprises a pair of valve members successively actuated at opposed ends of the stroke of the main piston and connected to apply said auxiliary control pressure to said surge piston when neither valve member is actuated, and to release said auxiliary control pressure from said surge piston when either valve member is actuated.

19. A pump as described in claim 8, in which said last-mentioned means comprises a pair of valve members successively actuated at opposed ends of the stroke of the main piston and connected to apply said auxiliary control pressure to said surge piston when neither valve member is actuated, and to release said auxiliary control pressure from said surge piston when either valve member is actuated, each of said valve members, when actuated, admitting auxiliary pressure fluid to said reversing valve mechanism to reverse it.

20. A pump as described in claim 8, in which said reversing valve mechanism comprises a fluid-actuated main valve, and in which said last-mentioned means includes a pilot valve, an auxiliary control pressure inlet to said pilot valve, fluid connections from said pilot valve to said main valve, whereby the latter is actuated by said auxiliary pump control pressure under control of said pilot valve, and auxiliary valve mechanism for controlling the admission to and release of auxiliary control pressure from said surge piston in synchronism with the actuation of said main valve, said auxiliary valve being controlled by said pilot valve independently of said main valve.

21. A pump as described in claim 8, including a pair of independently operable pilot valves adapted to be successively actuated at the opposite ends of the stroke of said main pistons, said pilot valves when actuated controlling the actuation of said reversing valve, and the release of said control pressure from said surge piston.

22. Apparatus as described in claim 4, in which said other means comprises an inlet for control fluid under pressure, a third face on said surge piston means, means for communicating said control fluid inlet with said third face during intervals of maximum flow of said pump, and releasing control fluid from said third face during intervening intervals.

23. Apparatus as described in claim 4, in which said other means comprises an inlet for control fluid under pressure, a third face on said surge piston means, means for communicating said control fluid inlet with said third face during intervals of maximum flow of said pump and communicating said third face on said surge piston means with said motive fluid outlet connection during intervening intervals.

24. Apparatus as described in claim 4, in which said other means comprises an inlet for control fluid under pressure, a third face on said surge piston means, means defining a restricted passage between said control fluid inlet and said third face, and means for diverting control fluid that has flowed through said restricted passage away from said piston means, between intervals of normal flow of pumped fluid from said pump.

25. In combination: a fluid-actuated pump comprising main cylinder means having main piston means therein actuated by motive fluid under pressure for delivering a pulsating flow of pump fluid, said pump having motive fluid inlet and outlet connections and pump fluid inlet and outlet connections, valve means for controlling the admission and exhaust of motive fluid to said pump; auxiliary cylinder means having auxiliary piston means therein actuated by said motive fluid, said auxiliary cylinder means having motive fluid and pump fluid inlet and outlet connections communicable respectively with said first-named connections, valve means for controlling the admission and exhaust of motive fluid to said auxiliary cylinder means, said last-named valve means being synchronized with said first-named valve means to cause actuation of said auxiliary piston means only during reversal of the stroke of said main piston means.

26. The combination described in claim 25, in which said last-named valve means is connected to said first-named valve means.

27. The combination described in claim 25, in which both said valve means are controlled by movement of the main piston means.

28. The combination described in claim 25, in which both said valve means are fluid-actuated and controlled by a pilot valve actuated responsive to movement of said main piston means.

29. In combination, a hydraulic pump having piston means actuated by motive liquid under pressure for delivering a pulsating flow of pump liquid, said pump having motive liquid inlet and outlet connections and pump liquid inlet and outlet connections, valve means for controlling the flow of motive liquid to said pump; auxiliary piston means actuated by said motive liquid for intermittently delivering pump liquid into the discharge of said pump, auxiliary valve means for controlling the flow of motive liquid to said auxiliary piston means, said last-named valve means being actuated in positively timed relation to said first-named valve means to cause said auxiliary piston means to deliver pump liquid only between pulsations in the delivery of said first-named piston means.

30. The combination as described in claim 29, including auxiliary valve means controlling actuation of said auxiliary piston means, said auxiliary valve means being actuated in positively timed relation to said first-named valve means.

31. The combination as described in claim 29, including auxiliary valve means controlling actuation of said auxiliary piston means, said auxiliary valve means being mechanically connected to said first-named valve means.

32. In a hydraulic pump, a pair of main cylinders, a main piston reciprocable in each cylinder, said pistons being interconnected for reciprocation in unison, suction and discharge connections to said pump, inlet and exhaust connections for motive liquid for actuating said pump, reversing valve mechanism for controlling the admission and exhaust of motive liquid, a surge cylinder, a surge piston therein, said surge piston being operable to discharge pump liquid into said pump discharge connection in response to predetermined movement of said surge piston, and means for effecting said predetermined movement of said surge piston during and only during movement of said reversing valve.

33. In a hydraulic pump, a pair of main cylinders, a main piston reciprocable in each cylinder, said pistons being interconnected for reciprocation in unison, suction and discharge connections to said pump, inlet and exhaust connections for motive liquid for actuating said pump, reversing valve mechanism for controlling the admission and exhaust of motive liquid, a surge cylinder, a surge piston therein, and means for effecting restoring movement of said surge piston while and only while said reversing valve is stationary.

34. The combination as described in claim 2, in which said other means comprises another face on said piston means, and means for selectively applying pressure fluid to said other face at a limited rate of flow.

WALDEMAR F. MAYER.